US011456605B2

United States Patent
Bartlett et al.

(10) Patent No.: US 11,456,605 B2
(45) Date of Patent: Sep. 27, 2022

(54) AUTONOMOUS MOBILE POWER SUPPLY WITH TASK OR USER TRACKING

(71) Applicant: FreeWire Technologies, Inc., San Leandro, CA (US)

(72) Inventors: Scott Bartlett, San Leandro, CA (US); Martin Lynch, San Leandro, CA (US)

(73) Assignee: FREEWIRE TECHNOLOGIES, INC., Newark, CA (US)

( * ) Notice: Subject to any disclaimer, the term of this patent is extended or adjusted under 35 U.S.C. 154(b) by 0 days.

(21) Appl. No.: 17/139,932

(22) Filed: Dec. 31, 2020

(65) Prior Publication Data

US 2021/0281091 A1     Sep. 9, 2021

Related U.S. Application Data

(60) Provisional application No. 62/956,230, filed on Dec. 31, 2019.

(51) Int. Cl.
*H01M 10/44* (2006.01)
*H01M 10/46* (2006.01)
*H02J 7/00* (2006.01)
*H02J 50/80* (2016.01)

(52) U.S. Cl.
CPC ........ *H02J 7/0044* (2013.01); *H02J 7/00032* (2020.01); *H02J 7/00712* (2020.01); *H02J 50/80* (2016.02)

(58) Field of Classification Search
CPC .. H02J 7/0044; H02J 7/00032; H02J 7/00712; H02J 7/00034; Y02T 10/70; Y02T 10/7072; G05D 1/0278
USPC .......... 320/104, 107, 111, 114, 115
See application file for complete search history.

(56) References Cited

U.S. PATENT DOCUMENTS

| 9,467,862 | B2 * | 10/2016 | Zeiler | G01S 19/16 |
| 9,592,742 | B1 * | 3/2017 | Sosinov | B60L 53/14 |
| 9,756,402 | B2 * | 9/2017 | Stampfl | B25F 5/00 |
| 2016/0261698 | A1 * | 9/2016 | Thompson | G10L 15/22 |
| 2018/0099846 | A1 * | 4/2018 | High | G05D 1/0022 |

OTHER PUBLICATIONS

"Robotic Luggage on the Horizon Electric Vehicles Research," https://www.electricvehiclesresearch.com/articles/13445/robotic-luggage-on-the-horizon. Jan. 16, 2018 (Year: 2018).*

* cited by examiner

*Primary Examiner* — Edward Tso
(74) *Attorney, Agent, or Firm* — Marshall, Gerstein & Borun LLP (57) ABSTRACT

Aspects of the present invention pertain to apparatuses, systems, and methods to provide power for electric power devices such as electric power tools.

14 Claims, 5 Drawing Sheets

AUTONOMOUS MOBILE POWER SUPPLY WITH TASK OR USER TRACKING

CROSS-REFERENCE TO RELATED APPLICATIONS

The present application claims benefit of U.S. Provisional Patent application Ser. No. 62/956,230, entitled AUTONOMOUS MOBILE POWER SUPPLY WITH TASK OR USER TRACKING," to Scott BARTLETT and Martin LYNCH, filed Dec. 31, 2019. The present application is related to U.S. patent application Ser. No. 14/681,415, entitled "SYSTEMS, APPARATUS, AND METHODS OF CHARGING ELECTRIC VEHICLES" to Arcady SOSINOV, Sanat KAMAL BAHL, Love KOTHARI, and Sameer MEHDIRATTA, filed Apr. 8, 2015, which claims benefit of U.S. Provisional Patent application Ser. No. 61/977,493, entitled "SYSTEMS, APPARATUS, METHODS OF BATTERY CHARGING USING A MOBILE CHARGER," to Arcady SOSINOV, Sanat KAMAL BAHL, Love KOTHARI, and Sameer MEHDIRATTA, filed Apr. 9, 2014; U.S. patent application Ser. No. 14/681,415, entitled "SYSTEMS, APPARATUS, AND METHODS OF CHARGING ELECTRIC VEHICLES" to Arcady SOSINOV, Sanat KAMAL BAHL, Love KOTHARI, and Sameer MEHDIRATTA, filed Apr. 8, 2015 and U.S. Provisional Patent application Ser. No. 61/977,493, entitled "SYSTEMS, APPARATUS, METHODS OF BATTERY CHARGING USING A MOBILE CHARGER," to Arcady SOSINOV, Sanat KAMAL BAHL, Love KOTHARI, and Sameer MEHDIRATTA, filed Apr. 9, 2014; all of these applications are incorporated herein in their entirety by this reference for all purposes.

BACKGROUND

The use of electrically powered devices such as electric power tools has increased significantly. With improvements in battery technology, a variety of options and technologies exist that may solve one or more challenges to further expanding the use of electrically powered devices such as electric power tools. The present inventors have developed one or more solutions that may address one or more problems related to using electrically powered devices such as electric power tools.

SUMMARY

One aspect of the present invention pertains to a system to provide electric power to electric power tools. Another aspect of the present invention pertains to a network connecting one or more mobile power supplies with one or more power tools so as to provide access to power upon need by the one or more power tools. Another aspect of the present invention pertains to a method of providing power to electric power tools in use at a work location. According to one or more embodiments of the present invention, the electric power tools are cordless power tools that use a power pack comprising batteries, capacitors, or combinations thereof. According to one or more embodiments of the present invention, the electric power tools are corded power tools.

It is to be understood that the invention is not limited in its application to the details of construction and to the arrangements of the components set forth in the following description. The invention is capable of other embodiments and of being practiced and carried out in various ways. In addition, it is to be understood that the phraseology and terminology employed herein are for the purpose of description and should not be regarded as limiting.

BRIEF DESCRIPTION OF THE DRAWINGS

FIG. 4-1 is a diagram of one or more embodiments of the present invention.

FIG. 4-2 is a diagram of one or more embodiments of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding embodiments of the present invention.

DESCRIPTION

In the following description of the figures, identical reference numerals have been used when designating substantially identical elements or processes that are common to the figures.

Unless otherwise defined, all technical and scientific terms used herein have the same meaning as commonly understood by one of ordinary skill in the art to which this invention belongs. In case of conflict with publications, patent applications, patents, and other references mentioned or incorporated herein by reference, the present specification, including definitions, will control.

Various embodiments of the present invention may include any of the described features, alone or in combination. Other features and/or benefits of this disclosure will be apparent from the following description.

For the following defined terms, these definitions shall be applied, unless a different definition is given in the claims or elsewhere in this specification.

"Autonomous" is defined herein as meaning capable of operating without direct real-time control by a person(s) or operating without direct real-time control by a person(s).

"Electric power tool" is defined herein as meaning a device that uses electric power to perform work such as a physical task for which at least some of the energy for the task is provided by electric energy such as from an onboard stored electric energy source such as a battery and/or such as a capacitor or other source through a wired power cord. Examples of types of electric power tools include, but are not limited to, blowers, caulking guns, cutters, drills, drivers, fans, grinders, hammers, lights, multi-tools, nail guns, routers, sanders, saws, shears, soldering irons, sprayers, staple guns, wrenches, vacuums, and similar devices.

"Mobile" is defined herein as meaning capable of moving and/or being moved and is not fixed to one position or place.

"Motorized" is defined herein as meaning capable of self-propulsion such as having a motor, an engine, or other drive mechanism to accomplish locomotion.

"Remote control" is defined herein as meaning operating or being controlled from a distance either wired or wireless.

"Wireless" is defined herein as meaning not having a solid physical connection for conveying information, data, signals, energy, or combinations thereof.

"Wired" is defined herein as meaning having a solid physical connection for conveying information, data, signals, energy, or combinations thereof.

All numeric values are herein defined as being modified by the term "about," whether or not explicitly indicated. The term "about" generally refers to a range of numbers that a person of ordinary skill in the art would consider equivalent to the stated value to produce substantially the same properties, function, result, etc. A numerical range indicated by a low value and a high value is defined to include all numbers subsumed within the numerical range and all subranges subsumed within the numerical range. As an example, the range 10 to 15 includes, but is not limited to, 10, 10.1, 10.47, 11, 11.75 to 12.2, 12.5, 13 to 13.8, 14, 14.025, and 15.

The order of execution or performance of the operations or the processes in embodiments of the invention illustrated and described herein is not essential, unless otherwise specified. That is, the operations or the processes may be performed in any order, unless otherwise specified, and embodiments of the invention may include additional or fewer operations or processes than those disclosed herein. For example, it is contemplated that executing or performing a particular operation or process before, simultaneously with, contemporaneously with, or after another operation or process is within the scope of aspects of the invention.

As will be understood by a person skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as an "apparatus", a "circuit," a "module" or a "system." Furthermore, aspects of the present invention may take the form of a computer program product embodied in one or more non-transitory computer readable medium(s) having computer readable program code embodied, e.g., stored, thereon.

Any combination of one or more non-transitory computer readable mediums may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java™, Smalltalk, C++ or the like and conventional procedural programming languages, such as the "C" programming language, such as .net framework and Microsoft Corporation programming languages and databases, such as HTML5, Android Mobile applications and Apple Corporation iOS mobile applications, or similar programming languages. The program code may execute entirely on a local computer, partly on the local computer, as a stand-alone software package, partly on the local computer and partly on a remote computer, or entirely on the remote computer or server. In the latter scenario, the remote computer may be connected to the local computer through any type of network, including a local area network (LAN) or a wide area network (WAN), or the connection may be made to an external computer (for example, through the Internet using an Internet Service Provider). The program code may reside on remote servers and software networks such as for cloud computing such as, but not limited to, Amazon Web Services, Google cloud etc. Mobile applications of the program code may also be available for download from services such as Apple App store and Google play.

Aspects of the present invention are described below with reference to flowchart illustrations and/or block diagrams of methods, processes, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions which execute via the processor of the computer, other programmable data processing apparatus, or other devices enable implementation of the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following description is primarily directed towards providing access to power to charge electric power tool power packs or to providing charged electric power tool power packs, such as for electric power tools used at construction or renovation sites. It is to be understood that one or more embodiments of the present invention apply to providing access to power to charge electric power tool power packs or to providing charged electric power packs for other electrically powered devices such as, but not limited to, computers, radios, and telephones.

The following documents are incorporated herein in their entirety by this reference for all purposes: U.S. Pat. Nos. 9,467,862, 9,592,742, 9,756,402, 10,146,976, and United States Patent Application 2007/0096691.

Figure 1:
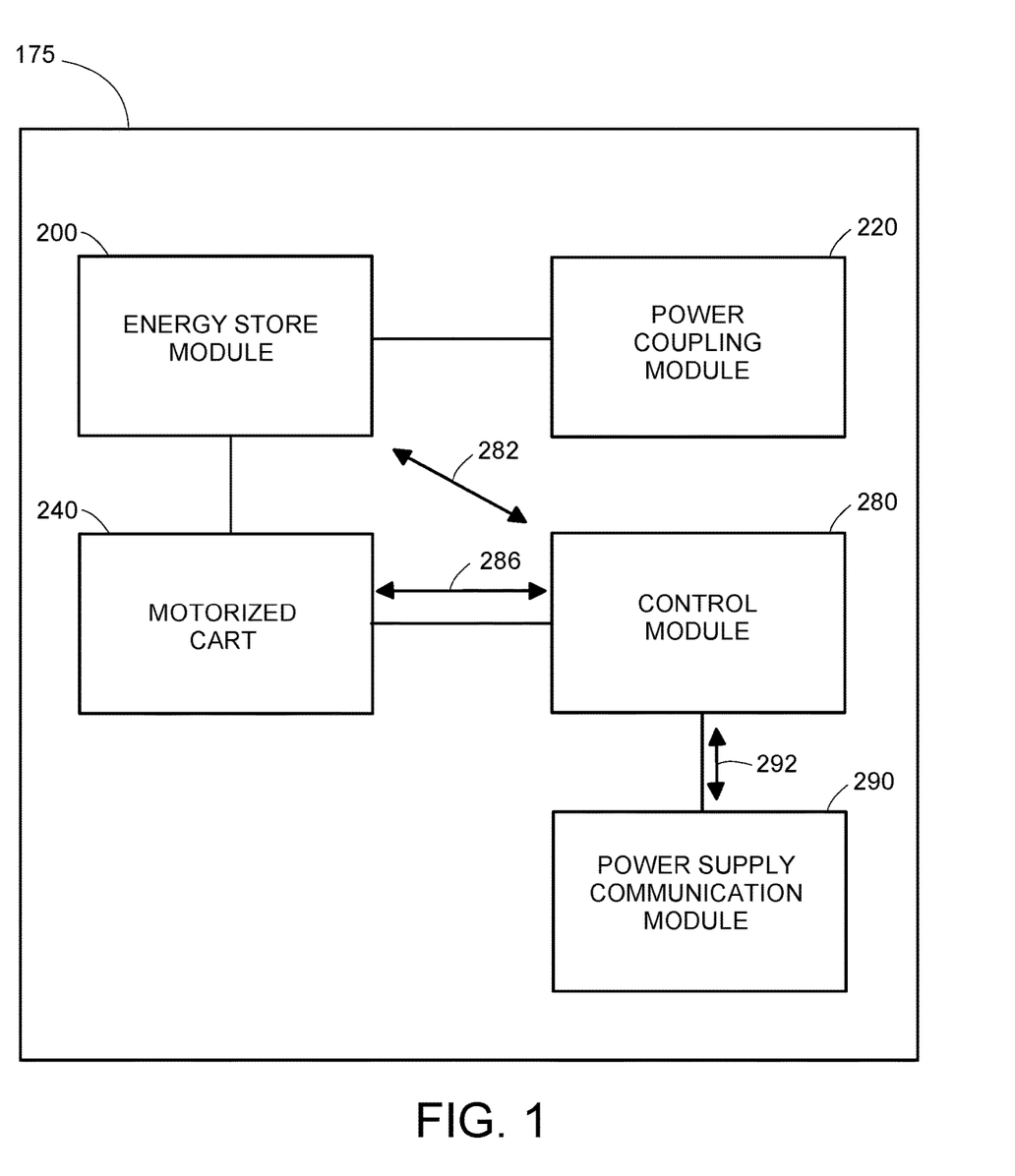
FIG. 1 is a diagram of an electric power supply according to one or more embodiments of the present invention.

Reference is now made to FIG. 1 where there is shown a box diagram of an electric power supply 175 according to one or more embodiments of the present invention. Electric power supply 175 comprises an energy store module 200 and a power coupling element 220. Power coupling element 220 is connected with energy store module is 200 so as to enable a transfer of electric energy derived from energy store module 200 to an electrically powered device (not shown). FIG. 1 also shows electric power supply 175 including a motorized cart 240, a control module 280, and a power supply communication module 290. Energy store module 200, power coupling module 220, motorized cart 240, control module 280, and power supply communication module 290 are mounted with motorized cart 240 so as to enable locomotion of electric power supply 175 such as for moving from a first location to a second location. Control module 280 is connected with motorized cart 240 so that electric power supply 175 can move from the first location to the second location by commands from control module 280. More specifically, control module 280 is connected with motorized cart 240 so as to provide information exchange to allow control of the movement of motorized cart 240. Control module 280 is also connected for communication with energy store module 200 and with power supply communication module 290 for information exchange. The communication connections between control module 280, energy store module 200, and motorized cart 240 may be accomplished by either wired connection or wireless connections or a combination thereof. Electric power supply 175 includes one or more sensors (not shown in FIG. 1) connected with and/or integrated into control module 280 for data collection.

FIG. 1 indicates information transfer between energy store module 200 and control module 280 with an arrow 282 and indicates information transfer between motorized cart 240 and control and communication system 280 with an arrow 286. The information transfer may include data from sensors (not shown in FIG. 1) such as to indicate the status of energy store module 200, the status of motorized cart 240, operating instructions or commands, or other information.

According to another embodiment of the present invention, one or more sensors are included in electric power supply 175 which provide data about the surroundings of electric power supply 175. Examples of these sensors include, but are not limited to, impediments sensors such as to detect the presence of barriers or other obstructions to the movement of electric power supply 175, sensors for machine vision such as cameras, sensors to detect foreign objects, sensors to detect other objects that electric power supply 175 needs to detect in order to operate autonomously and/or by remote control, and combinations thereof.

Electric power supply 175 may be implemented as one or more embodiments of the present invention in a variety of configurations. According to one embodiment of the present invention, electric power supply 175 comprises an electric energy source such as a battery, a fuel cell, a capacitor, or combinations thereof. In one configuration, the source of the electric energy is stored onboard electric power supply 175 such as storage in a battery, a capacitor, or combinations thereof. As an option for one or more embodiments, energy store module 200 comprises a battery pack. According to one or more embodiments of the present invention, energy store module 200 comprises a 1 kWh capacity battery pack. According to one or more embodiments of the present invention, energy store module 200 comprises a 10 kWh capacity battery pack. According to another embodiment of the present invention, energy store module 200 comprises a 48 kWh capacity battery pack.

Power coupling element 220 may include substantially any type of electric power connector to provide electric power to electrically powered devices such as power tools and battery packs used by power tools. According to one embodiment of the present invention, power coupling element 220 includes conductive connectors suitable for providing power to electrically powered devices such as power tools or to battery packs used by power tools. As an option, the conductive connectors may include standard National Electrical Manufacturers Association (NEMA) connectors such as those suitable for blowers, caulking guns, cutters, drills, drivers, fans, grinders, hammers, lights, multi-tools, nail guns, routers, sanders, saws, shears, soldering irons, sprayers, staple guns, wrenches, vacuums, and similar devices. Alternatively, the power coupling module for one or more embodiments of the present invention may include connectors other than NEMA connectors. As another option, power coupling module 220 may use wireless power transfer to electrically powered devices or to battery packs for electrically powered devices.

Motorized cart 240 has a typical structure of a cart with the addition of a motor, an engine, or other drive system. More specifically, motorized cart 240 may include a housing, a frame, a base, and/or a platform having one or more wheels or treads rotatably coupled thereto. The motor is coupled to the one or more wheels or treads to accomplish locomotion of the cart, i.e. movement from place to place, such as from a first location to a second location.

Control module 280 may have a variety of configurations for one or more embodiments of the present invention. According to one embodiment of the present invention, control module 280 comprises a computer, a central processing unit, a microprocessor, an electronic memory, an application specific integrated circuit, a field programmable gate array, an information processor, or combinations thereof. Embodiments of the present invention may also have control module 280 further comprising a display, a user interface, or combinations thereof.

According to one or more embodiments of the present invention, power supply communication module 290 comprises a transmitter circuit, a receiver circuit, a transceiver circuit, a global positioning system, or combinations thereof to provide location information for electric power supply 175 to command module 280. The location information can be used for autonomously controlling movement of electric power supply 175 and/or remote control movement of electric power supply 175.

According to one or more embodiments of the present invention, power supply communication module 290 is also configured to communicate with one or more electrically powered devices so as to provide information from the one or more electrically powered devices to control module 280.

According to one or more embodiments of the present invention, control module 280 comprises a computer program product to accomplish electric power transfer to electrically powered devices or to battery packs of electrically powered devices from energy store module 200. The computer program product may further accomplish controlling the movement of power supply 175 by providing commands to a drive system of motorized cart 240. Still further, the computer program product of control module 280 may be configured to accomplish control of information and communications for the operation of electric power supply 175. The computer program product is embodied in a non-transitory computer readable medium and comprising computer instructions for controlling the performance of electric power supply 175, controlling the actions and operation of electric power supply 175, controlling the place to place movement of electric power supply 175, controlling reception and transmission of information for electric power supply 175, controlling autonomous operation of electric power supply 175, and combinations thereof. Optionally, the non-transitory computer readable medium may reside entirely on electric power supply 175 or at a remote location such as a network location, a cloud storage location, a network server, or combinations thereof.

According to one or more embodiments of the present invention, the transmitter circuit and/or receiver circuit used by power supply communication module 290 are embodied in a transmitter, receiver, or transceiver such as those typically used for electronic device communication systems. Examples of electronic device transmitter systems suitable for one or more embodiments of the present invention include, but are not limited to, BLUETOOTH® (also known as IEEE 802.15), near-field communications technology (NFC), Wi-Fi, a local area network, cloud software application, or a locally-hosted software application.

According to one or more embodiments of the present invention, electric power supply 175 comprises an energy store module 200; a power coupling module 220 connected with energy store module 200 to transfer electric energy from the energy store module 200 to an electric power tool (not shown in FIG. 1) to power the electric power tool or to a power tool power pack (not shown in FIG. 1) to charge the electric power tool power pack. Electric power supply 175 further comprises a power supply communication module 290 to communicate with the one or more power tools (not shown in FIG. 1) or one or more power tool power packs. Electric power supply 175 also comprises a motorized cart 240 having energy store module 200, power coupling module 220, power supply communication module 290 mounted thereon for locomotion of electric power supply 175. Electric power supply 175 also comprises a control module 280 carried by motorized cart 240. Control module 280 is connected with power supply communication module 290 to accomplish data and command transmissions and to process information. Control module 280 is connected with motorized cart 240 so that electric power supply 175 accomplishes autonomous movement to maintain a predetermined distance to a power tool, a smartphone, or other communication device.

According to one or more embodiments of the present invention, electric power supply 175 is configured for use at a construction or renovation site such as for a building, house, or residential structure which may include standard doorway sizes. For such embodiments of the present invention, electric power supply 175 has maximum widths of less than 30 inches, 32 inches, or 36 inches and maximum height of less than 80 inches so as to fit through standard doorways such as those specified in the International Residential Code and the International Building Code provided by the International Code Council.

Figure 2:
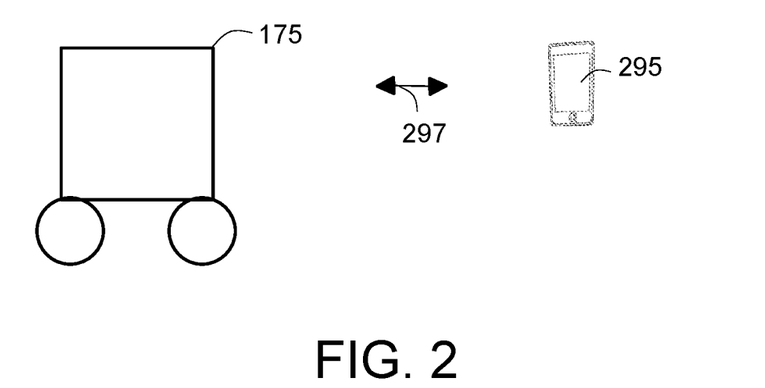
FIG. 2 is a diagram of one or more embodiments of the present invention.

Reference is now made to FIG. 2 where there is shown an electric power supply 175 that is essentially the same as electric power supply 175 described above for FIG. 1. FIG. 2 also shows a communication device 295 which may be a communication device such as a smart phone or other type of device capable of communicating with electric power supply 175 such as to accomplish information transfer. Arrow 297 is provided to indicate two-way communication between electric power supply 175 and communication device 295. According to one or more embodiments of the present invention, the communication between electric power supply 175 and communication device 295 may only be one way communication in which communication device 295 transmits information to electric power supply 175. As an example, communication device 295 may be a wireless transmitter such as a radio transmitter.

Examples of the type of information transferred between electric power supply 175 and communication device 295 include, but are not limited to, location information for the communication device 295, signals to instruct electric power supply 175 to move to a position proximate communication device 295, requested proximity for positioning of electric power supply 175, estimated arrival times for electric power supply 175, estimates or actual values of required power, the form of the power to be supplied such as hardwired connection, power tool power pack, type of battery pack, number of battery packs, or combinations thereof.

According to one or more embodiments of the present invention, electric power supply 175 includes computer executable instructions to allow electric power supply 175 to move to and maintain a specified proximity to communication device 295. More specifically, electric power supply 175 is programmed so as to track and follow communication device 295 so that movement of communication device 295 from one location to another location causes a similar movement of electric power supply 175 to maintain the specified proximity.

According to one or more embodiments of the present invention, a person carrying communication device 295 may be performing a work activity using an electric power tool. Electric power supply 175 enables the user to have access to an electric power source for the electric power tool so that power is substantially available continuously and the work can be performed with substantially minimal interruption.

Figure 3:
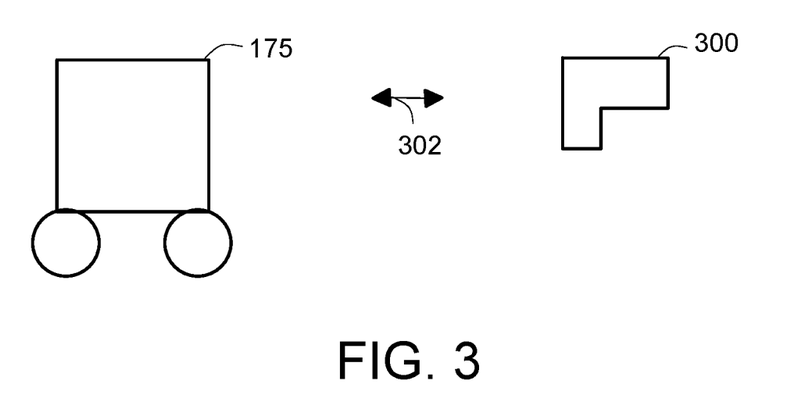
FIG. 3 is a diagram of one or more embodiments of the present invention.

Reference is now made to FIG. 3 where there is shown an electric power supply 175 that is essentially the same as electric power supply 175 described above for FIG. 1. FIG. 3 also shows a cordless electric power tool 300 which may be a power tool such as one or more blowers, caulking guns, cutters, drills, drivers, fans, grinders, hammers, lights, multi-tools, nail guns, routers, sanders, saws, shears, soldering irons, sprayers, staple guns, wrenches, vacuums, and similar devices that are configured to also be capable of communicating with electric power supply 175 such as to accomplish information transfer. Arrow 302 is provided to indicate two-way communication between power supply 175 and cordless power tool 300. According to one or more embodiments of the present invention, the communication between power supply 175 and cordless power tool 300 may only be one way communication in which cordless power tool 300 transmits information to electric power supply 175.

Examples of the type of information transferred between electric power supply 175 and cordless electric power tool 300 include, but are not limited to, location information for cordless electric power tool 300, signals to instruct electric power supply 175 to move to a position proximate cordless electric power tool 300, estimates or actual values of required power, the form of the power to be supplied such as hardwired connection, power tool power pack, type of battery pack, number of battery packs, power level for the cordless electric power tool 300, cordless electric power tool 300 status, cordless power tool 300 usage data, or combinations thereof.

According to one or more embodiments of the present invention, electric power supply 175 includes computer executable instructions to allow power supply 175 to move to and maintain a specified proximity to cordless electric power tool 300. More specifically, electric power supply 175 is programmed so as to track and follow cordless electric power tool 300 so that movement of cordless electric power tool 300 from one location to another location causes a similar movement of electric power supply 175 to maintain the specified proximity.

According to one or more embodiments of the present invention, a person carrying or using cordless electric power tool 300 may be performing a work activity. Electric power supply 175 enables the user to have access to an electric power source for cordless electric power supply 300 so that power is substantially available continuously and the work can be performed with substantially minimal interruption.

According to one embodiment, a charged replacement power pack for cordless power tool 300 may be obtained from electric power supply 175. By having electric power supply 175 near the location of electric power tool 300, the user of a power tool does not have to spend time going to a more distant location to get a replacement power pack or wait to have a replacement power pack delivered. Furthermore, the discharge power pack may be connected with electric power supply 175 to be charged so that it can be used after charging.

According to one or more embodiments of the present invention, electric power supply 175 is configured to communicate with one or more communication devices, power tools, or combinations thereof. More specifically electric power supply 175 may communicate with one or more smart phones, one or more tablet computers, one or more desktop computers, one or more laptop computers, one or more remote controllers, one or more data networks, or combinations thereof.

According to one or more embodiments of the present invention, electric power supply 175 autonomously moves itself so as to maintain a predetermined distance of 3 to 100 feet and all values, ranges, and subranges subsumed therein from the communication device 295 or cordless power tool 300. According to another embodiment of the present invention, electric power supply 175 autonomously moves itself so as to maintain a predetermined distance of 5 to 12 feet and all values, ranges, and subranges subsumed therein from the communication device 295 or cordless power tool 300.

According to one or more embodiments of the present invention, electric power supply 175 accomplishes movement to the predetermined distance using data derived from a global positioning system (GPS) coordinates of electric power supply 175 and the GPS coordinates of communication device 295 or the cordless power tool 300.

According to one or more embodiments of the present invention, electric power supply 175 carries one or more replacement power packs for one or more power tools. Optionally, the power packs carried by electric vehicle charger 175 are being charged or have been charged with electric energy from electric power supply 175. Optionally, the extra power packs may be attached with the power coupling module of electric power supply 175 or otherwise connected electric power supply 175.

Figure 41:
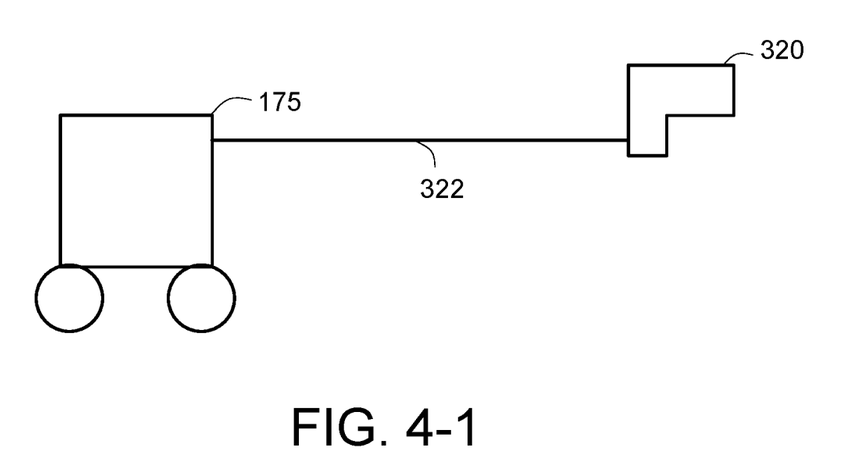
Figure 42:
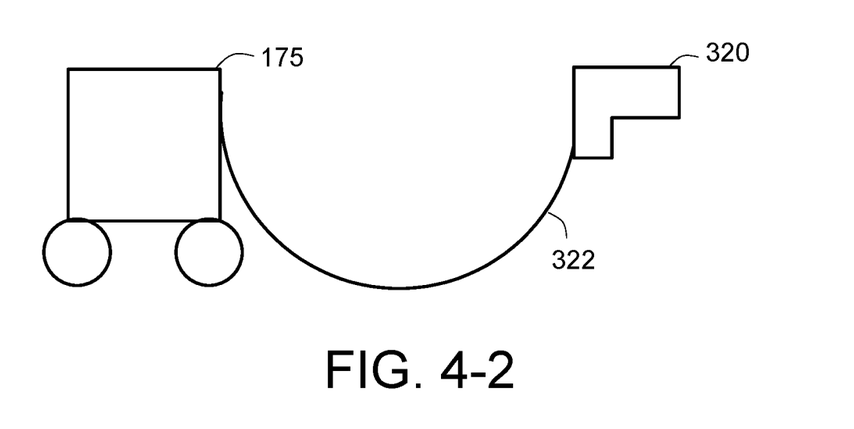

Reference is now made to FIGS. 4-1 and 4-2 where there is shown an electric power supply 175 that is essentially the same as electric power supply 175 described above for FIG. 1. FIGS. 4-1 and 4-2 also show a corded electric power tool 320 which may be a power tool such as one or more blowers, caulking guns, cutters, drills, drivers, fans, grinders, hammers, lights, multi-tools, nail guns, routers, sanders, saws, shears, soldering irons, sprayers, staple guns, wrenches, vacuums, and similar devices that are connected with electric power supply 175 such as to receive electric power by way of electric power cord 322. Optionally electric power cord 322 may be fixedly attached to corded electric power tool 320 or electric power cord 322 may be part of the power coupling module of electric power supply 175. For illustration, FIG. 4-1 shows power cord 320 between electric power supply 175 and power tool 320 as substantially fully extended. FIG. 4-2 shows power cord 320 between electric power supply 175 and power tool 320 as only partially extended.

According to one or more embodiments of the present invention, electric power supply 175 includes computer executable instructions to allow power supply 175 to move to and maintain a specified proximity to corded electric power tool 320 such that the proximity is within the length of power cord 322. Optionally, electric power supply 175 is programmed so as to track and follow corded electric power tool 320 such as by using GPS coordinates so that movement of corded electric power tool 320 from one location to another location causes a similar movement of electric power supply 175 to maintain the specified proximity. As another option, electric power supply 175 may be configured to be responsive to forces exerted on power cord 322 so as to move and maintain proximity to corded power tool 320 based on the magnitude and direction of those forces.

Embodiments of the present invention such as those shown in FIGS. 4-1 and 4-2 enable access to electric power for corded electric power tools in areas that may not have access to electric power such as in remote areas or at work or construction sites that do not have working electrical infrastructure for performing a work activity. According to one or more embodiments of the present invention, electric power supply 175 may have a high capacity energy store module to allow higher electric power use with corded power tools that cannot be or cannot be easily achieved using cordless electric power tools. Being mobile and autonomously driven reduces the hindrance of high weight that may be necessary for the high energy storage capacity. In other words, the user does not have to lift, carry, or move electric power supply 175 because it is self propelled. The autonomous movement control also reduces or eliminates the need for the user to reposition electric power supply 175 as the user moves in performing work tasks using corded power tool 320. Electric power supply 175 enables the user to have access to an electric power source for corded electric power tool 320 so that power is substantially available continuously and the work can be performed with substantially minimal interruption and with the possibility of higher power usage than is achievable using cordless power tools.

According to one or more embodiments of the present invention, power cord 322 may have a variety of possible lengths. An example embodiment of the present invention may have power cord 322 having length in the range from 3 feet to 100 feet or more.

According to one or more embodiments of the present invention, the power coupling module of electric power supply 175 comprises a power cord connector having one or more sensors to detect a direction and magnitude of forces exerted on the power cord connector through power cord 322. The one or more sensors may be connected with or in communication with the control module of electric power supply 175 to provide data to the control module for use such as determining the necessary movement of electric power supply 175 so as to maintain proximity to corded power tool 320. More specifically, the control module is responsive to the exerted force to move the electric power supply in the direction of the exerted force.

According to one or more embodiments of electric power supply 175, the power coupling module of electric power supply 175 comprises a power cord connector having one or more sensors to detect a direction and magnitude of a force exerted on the power cord connector through power cord 322. The one or more sensors are connected with or in communication with the control module of electric power supply 175 so that the control module is responsive to the exerted force to move electric power supply 175 in the direction of the exerted force until the exerted force is reduced.

According to one or more embodiments of the present invention, electric power supply 175 includes a power coupling module comprising a power cord 322 and one or more sensors coupled to power cord 322 to detect a direction of a force exerted on power cord 322. The one or more sensors are connected with or in communication with the control module. The control module of electric power supply 175 is responsive to the exerted force to move the electric power supply in the direction of the exerted force.

According to one or more embodiments of the present invention, electric power supply 175 includes a power coupling module comprising a power cord 322 and one or more sensors coupled to power cord 322 to detect a direction of a force exerted on power cord 322. The one or more sensors are connected with or in communication with the control module. The control module of electric power supply 175 is responsive to the exerted force to move the electric power supply in the direction of the exerted force until the exerted force is reduced.

Figure 5:
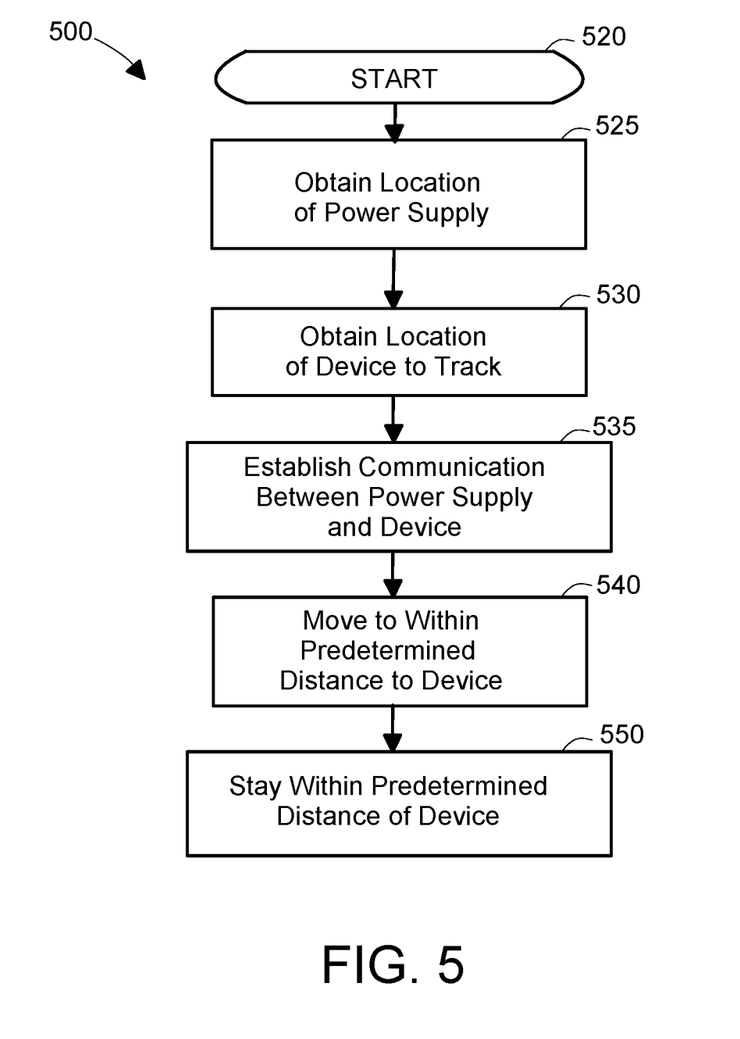
FIG. 5 is a diagram of a process flow according to one or more embodiments of the present invention.

Reference is now made to FIGS. 1, 2, 3, and 5. FIG. 5 shows a process flow diagram 500 for a method according to one aspect of the present invention. The method is performed using an electric power supply substantially the same as electric power supply 175 described above. Process flow diagram 500 includes process 520, process 525, process 530, process 535, process 540, and process 550.

Process 520 includes a start process for starting process flow diagram 500. Process 520 may involve steps such as turning on devices, starting software programs or apps, initializing parameters, etc. Process 520 may be performed by electric power supply 175, by a communication device such as communication device 295 described above, by a communication enabled power tool such as power tool 300 described above, by way of a network connected command source such as a smart phone, a tablet computer, a laptop computer, a desktop computer, or a server.

Process 525 includes providing electric power supply 175 and obtaining location information for electric power supply 175. The location information may be derived from a variety of sources such as a global positioning system included with electric power supply 175 using command module 280 and/or power supply communication module 290.

Process 530 includes providing a device for electric power supply 175 to track. The device to track may be a communication device such as communication device 295 described above or a communication enabled electric power tool such as cordless electric power tool 300 described above. Process 530 also includes obtaining location information for the device to track such as communication device 295 or cordless electric power tool 300.

Process 535 includes establishing communication between power supply 175 and the device to be tracked. According to one or more embodiments of the present invention, this communication is to accomplish transfer of location information for the device to be tracked to electric power supply 175. Process 535 may also include the transfer of information about the power status and other information that may be related to the power requirements for the device to be tracked. More specifically, if embodiments of the present invention in which the device to be tracked is electric power tool 300, then information such as the rate of usage of power, power reserves, type of electric power tool battery pack required, etc. can be transmitted to electric power supply 175. Alternatively, for embodiments of the present invention in which the device to be tracked is a communication device other than an electric power tool, then the communication device may provide additional information to electric power supply 175 about electric power tool power pack requirements for a user of one or more electric power tools.

Process 540 pertains to getting electric power supply 175 and a device to be tracked within a predetermined distance. This process can be achieved through a variety of options. According to one embodiment of the present invention, process 540 includes accomplishing movement of electric power supply 175 to within a predetermined distance from the device to be tracked. The movement of electric power supply 175, as an option, may be accomplished by having the electric power supply 175 autonomously move to get to within the predetermined distance of the device to be tracked. As another option, the device to be tracked may be moved to within the predetermined distance of electric power supply 175. In other words, electric power supply 175 may be moved, the device to be tracked may be moved, or combinations thereof so that they get within the predetermined distance.

To accomplish process 540, electric power supply 175 may include, but is not limited to, one or more processes, machine executable instructions, computer programs, computer program products, communications, and/or hardware described above to accomplish getting electric power supply 175 to within the predetermined distance of the device to be tracked. As an option, the computer programs may include computer programs for navigation such as GPS navigation software. Navigation software suitable for one or more embodiments of the present invention is available as commercial programs or as open source programs. Alternatively, custom-made navigation software may be used with one or more embodiments of the present invention.

As another alternative, one or more embodiments of the present invention includes having process 540 accomplished using artificial intelligence guidance of electric power supply 175. More specifically, electric power supply 175 may include an artificial intelligence program or may be connected with an artificial intelligence program through a network so as to accomplish movement to within the predetermined distance of the device to be tracked. The artificial intelligence program may use GPS information for location, data from sensor measurements about the surroundings of electric power supply 175, or combinations thereof to accomplish movement to maintain the predetermined distance of the device to be tracked.

Process 550 pertains to having electric vehicle power supply 175 maintain a position within the predetermined distance to the device to be tracked. According to one or more embodiments of the present invention, process 550 may be accomplished by having electric power supply 175 autonomously adjust its position so as to stay within the predetermined distance of the device to be tracked. The amount of time for electric power supply 175 to stay within the predetermined distance of the device to be tracked may be a parameter set by a user. In other words, the amount of time selected can be whatever amount of time a worker using a power tool may wish to have access to power available from electric power supply 175. The predetermined distance maintained during process 550 may be a parameter selected by a user. For one or more embodiments of the present invention, the predetermined distance may be from 3 feet to 100 feet and all values, ranges, and subranges subsumed therein. For one or more embodiments of the present invention, the predetermined distance may be 6 to 12 feet.

Figure 6:
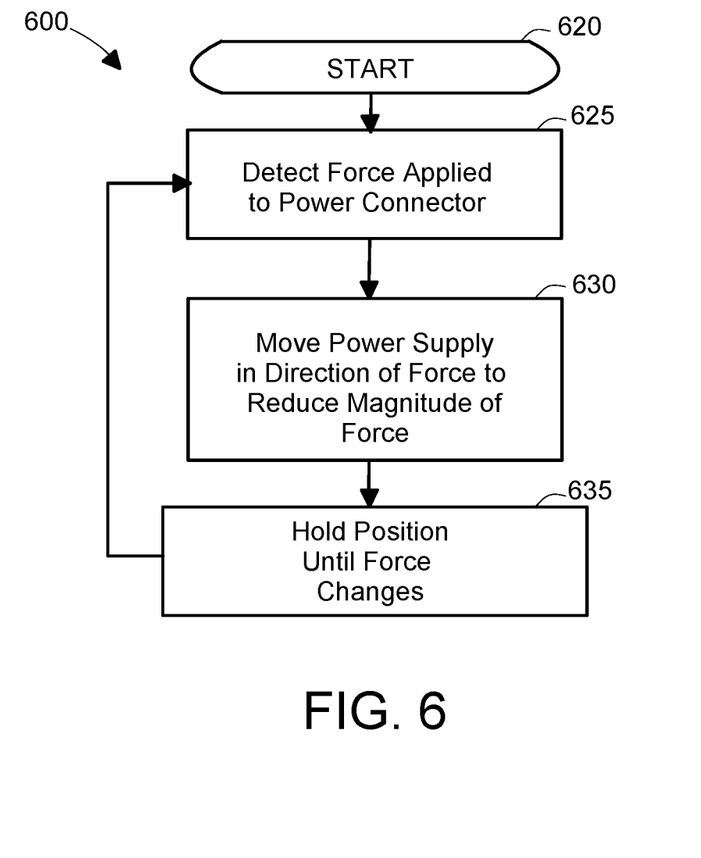
FIG. 6 is a diagram of a process flow according to one or more embodiments of the present invention.

Reference is now made to FIGS. 1, 4-1, 4-2, and 6. FIG. 6 shows a process flow diagram 600 for a method according to one aspect of the present invention. The method is performed using an electric power supply substantially the same as electric power supply 175, a corded electric power tool 320, and an electric power cord 322 all substantially as described above. Electric power supply 175 is connected with corded electric power tool 320 directly or indirectly by electric power cord 322 so as to provide electric power to corded electric power tool 320. The indirect connection may have another power cord connected between electric power supply 175 and corded electric power tool 320. Process flow diagram 600 includes process 620, process 625, process 630, and process 635.

Process 620 includes a start process for starting process flow diagram 600. Process 620 may involve steps such as turning on devices, starting software programs or apps, initializing parameters, etc. Process 620 may be performed or initiated by electric power supply 175 or initiated by corded electric power tool 320.

Process 625 includes having electric power supply 175 detect force applied from electric power cord 322. More specifically, electric power supply 175 is configured so as to be able to detect at least the direction of one or more forces detectable at the connection between electric power supply 175 and electric power cord 322. The detection of the force by electric power supply 175 may be accomplished using one or more force sensors connected with power coupling module 220 of electric power supply 175.

Process 630 pertains to accomplishing movement of power supply 175 in response to forces measured by the one or more force sensors. More specifically, data from the one or more force sensors are applied to control module 280 of electric power supply 175 so that control module 280 moves electric power supply 175 in a direction to reduce the magnitude of the force. According to one or more embodiments of the present invention, electric power supply 175 moves autonomously in response to forces applied to it by electric power cord 322 so as to avoid restriction of movement for corded power tool 320 while corded power tool 320 is being used for a work task. According to one or more embodiments of the present invention, electric power supply 175 moves so as to prevent electric power cord 322 from being taut.

Process 635 pertains to having electric power supply 175 hold position until there is a detected change in the force detected from electric power cord 322. According to one or more embodiments of the present invention, a change in force can be the result of movement of corded power tool 320 away from electric power supply 175 to make electric power cord 322 more taut. The magnitude and direction of the force may be parameters used to determine the responsivity for movement of electric power supply 175 caused by forces applied to electric power cord 322. For example, a lower threshold of force or change in force may be required to effect movement of electric power supply 175.

Process flow diagram 600 includes returning to process 625 from process 635 to accomplish adjustment of the position of electric power supply 175 in response to changes in the force from electric power cord 322. In other words, process flow 600 causes electric power supply 175 to adjust its position so as to maintain a distance from corded electric power tool 320 to prevent electric power cord 322 from being stretched to the point of hindering use of corded electric power tool 320.

According to one or more embodiments of the present invention, process flow 600 maintains electric power supply 175 at a position in relation to corded power tool 320 that is a distance less than or equal to the length of electric power cord 322. According to one or more embodiments of the present invention, electric power cord 322 may have a length greater than 3 feet. According to another embodiment of the present invention, electric power cord 322 has a length of 3 to 100 feet and all values, ranges, and subranges, subsumed therein. According to one or more embodiments of the present invention, electric power cord 322 has a length greater than 100 feet. For one or more embodiments of the present invention, the predetermined distance may be 6 to 12 feet.

To accomplish process 630 and/or 635, electric power supply 175 may include, but is not limited to, one or more processes, machine executable instructions, computer programs, computer program products, communications, and/or hardware described above to accomplish getting electric power supply 175 to a distance within the length of power cord 322 to corded power tool 320.

According to one or more embodiments of the present invention, process flow 600 allows a user of a corded electric power tool to have access to a supply of electric power that does not require a fixed electrical outlet such as a wall socket. This also means it is not necessary to change from one fixed electrical outlet to another as the corded electric power tool is being used and moved for a work task. For one or more embodiments of the present invention, the autonomous operation of electric power supply 175 allows corded electric power tool 322 be used with higher power available than may be possible with cordless electric power tools having battery packs. The autonomous movement of electric power supply 175, according to one or more embodiments of the present invention, reduces or eliminates the need for the user to move or control the movement of electric power supply 175 as needed so as to power corded electric power tool 320.

In the foregoing specification, the invention has been described with reference to specific embodiments; however, one of ordinary skill in the art appreciates that various modifications and changes can be made without departing from the scope of the present invention as set forth in the claims below. Accordingly, the specification is to be regarded in an illustrative, rather than a restrictive sense, and all such modifications are intended to be included within the scope of the present invention.

Benefits, other advantages, and solutions to problems have been described above with regard to specific embodiments; however, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. An electric power supply comprising:
an energy store module;
a power coupling element connected with the energy store module to transfer electric energy from the energy store module to an electric power tool to power the power tool or to a power tool power pack to charge the power tool power pack;
a power supply communication module to communicate with the one or more power tools;
a motorized cart having the energy store module, the power coupling element, the power supply communication module mounted thereon for locomotion of the electric power supply;
a control module carried by the motorized cart, the control module being connected with the power supply communication module to accomplish data and command transmissions, to process information, and connected with the motorized cart so that the electric power supply accomplishes autonomous movement to maintain a predetermined distance to the power tool or to a communication device; and
wherein the power coupling element comprises a power cord connector having one or more sensors to detect a force exerted on the power cord connector through a power cord; the one or more sensors being connected with the control module; the control module being responsive to the force to move the electric power supply in the direction of the exerted force.

2. The electric power supply of claim 1, wherein the control module being responsive to the force to move the electric power supply in the direction of the exerted force further comprises until the force is reduced.

3. The electric power supply of claim 1, wherein the electric power supply has maximum widths of less than 30 inches, 32 inches, or 36 inches and a maximum height of less than 80 inches.

4. The electric power supply of claim 1, wherein the energy store module is a 1 kWh capacity battery pack, a 10 kWh capacity battery pack, or a 48 kWh capacity battery pack.

5. The electric power supply of claim 1, wherein the electric power supply has maximum widths of less than 30 inches, 32 inches, or 36 inches and a maximum height of less than 80 inches and the energy store module is a 1 kWh capacity battery pack, a 10 kWh capacity battery pack, or a 48 kWh capacity battery pack.

6. An electric power supply comprising:
an energy store module;
a power coupling element connected with the energy store module to transfer electric energy from the energy store module to an electric power tool to power the power tool or to a power tool power pack to charge the power tool power pack;
a power supply communication module to communicate with the one or more power tools;
a motorized cart having the energy store module, the power coupling element, the power supply communication module mounted thereon for locomotion of the electric power supply;
a control module carried by the motorized cart, the control module being connected with the power supply communication module to accomplish data and command transmissions, to process information, and connected with the motorized cart so that the electric power supply accomplishes autonomous movement to maintain a predetermined distance to the power tool or to a communication device; and
wherein the power coupling element comprises a power cord and one or more sensors coupled to the power cord to detect a direction of a force exerted on the power cord; the one or more sensors being connected with the control module; the control module being responsive to the force to move the electric power supply in the direction of the force.

7. The electric power supply of claim 6, wherein the control module being responsive to the force to move the electric power supply in the direction of the force further comprises until the force is reduced.

8. The electric power supply of claim 6, wherein the electric power supply has maximum widths of less than 30 inches, 32 inches, or 36 inches and a maximum height of less than 80 inches.

9. The electric power supply of claim 6, wherein the energy store module is a 1 kWh capacity battery pack, a 10 kWh capacity battery pack, or a 48 kWh capacity battery pack.

10. The electric power supply of claim 6, wherein the electric power supply has maximum widths of less than 30 inches, 32 inches, or 36 inches and a maximum height of less than 80 inches and the energy store module is a 1 kWh capacity battery pack, a 10 kWh capacity battery pack, or a 48 kWh capacity battery pack.

11. A method comprising:
providing an electric power supply comprising:
an energy store module;
a power coupling element connected with the energy store module to transfer electric energy from the energy store module to an electric power tool to power the power tool or to a power tool power pack to charge the power tool power pack;
a power supply communication module to communicate with the one or more power tools;
a motorized cart having the energy store module, the power coupling element, the power supply communication module mounted thereon for locomotion of the electric power supply;
a control module carried by the motorized cart, the control module being connected with the power supply communication module to accomplish data and command transmissions, to process information, and connected with the motorized cart so that the electric power supply accomplishes autonomous movement to maintain a predetermined distance to the power tool or to a communication device;
providing a power tool;
providing one or more force direction sensors providing a power cord connected between the electric power supply and the power tool; and
allowing the control module to move the electric power supply so as to maintain a predetermined distance to the power tool that is within the length of the power cord.

12. The method of claim 11, wherein the electric power supply has maximum widths of less than 30 inches, 32 inches, or 36 inches and a maximum height of less than 80 inches.

13. The method of claim 11, wherein the energy store module is a 1 kWh capacity battery pack, a 10 kWh capacity battery pack, or a 48 kWh capacity battery pack.

14. The method of claim 11, wherein the electric power supply has maximum widths of less than 30 inches, 32 inches, or 36 inches and a maximum height of less than 80 inches and the energy store module is a 1 kWh capacity battery pack, a 10 kWh capacity battery pack, or a 48 kWh capacity battery pack.

* * * * *